(12) United States Patent
Brown, Jr. et al.

(10) Patent No.: US 11,492,284 B2
(45) Date of Patent: Nov. 8, 2022

(54) ROTARY DRIVEN STAGE

(71) Applicant: Applied Motion Systems, Inc., Vancouver, WA (US)

(72) Inventors: Howard K. Brown, Jr., Vancouver, WA (US); Andrew D. Drummond, Vancouver, WA (US); Dmitry Y. Mikailkeno, Vancouver, WA (US)

(73) Assignee: Applied Motion Systems, Inc., Vancouver, WA (US)

( * ) Notice: Subject to any disclaimer, the term of this patent is extended or adjusted under 35 U.S.C. 154(b) by 0 days.

(21) Appl. No.: 16/705,237

(22) Filed: Dec. 6, 2019

(65) Prior Publication Data
US 2021/0171386 A1 Jun. 10, 2021

(51) Int. Cl.
*C03B 35/06* (2006.01)
*B65G 65/00* (2006.01)

(52) U.S. Cl.
CPC ............ *C03B 35/064* (2013.01); *B65G 65/00* (2013.01); *B65G 2201/0244* (2013.01)

(58) Field of Classification Search
CPC ...................... C03B 35/064; B65G 2201/0244
See application file for complete search history.

(56) References Cited

U.S. PATENT DOCUMENTS

| 4,455,115 A | * | 6/1984 | Alger | ..................... B65H 31/16 177/147 |
| 2006/0096435 A1 | * | 5/2006 | Stein | ........................ B26D 9/00 83/651 |

* cited by examiner

*Primary Examiner* — Saul Rodriguez
*Assistant Examiner* — Willie Berry, Jr.

(57) ABSTRACT

An apparatus for translating along at least one plane, the apparatus a first support system and a second support system supporting the weight of a stage and the stage's load, the first support system providing for movement in a first axis and the second support system providing for movement in a second axis. The apparatus further having a first rotary motor engaged with a first timing belt. The first timing belt engaged with a first bearing car. The first bearing car engaged with a first linear rail. The first linear rail fixed to a frame. A second bearing car attached to the first bearing car, the second bearing car engaged to a second linear rail. The second linear rail at an incline with respect to the first linear rail, the second linear rail fixed to a stage. The apparatus further comprising a second rotary motor engaged with a second timing belt. The second timing belt engaged with a third bearing car, the third bearing car engaged with the first linear rail. A fourth bearing car attached to the third bearing car, the fourth bearing car engaged to a third linear rail. The third linear rail at an incline with respect to the first linear rail, the third linear rail not parallel to the second linear rail, and the third linear rail fixed to the stage.

16 Claims, 7 Drawing Sheets

ROTARY DRIVEN STAGE

REFERENCE TO RELATED APPLICATIONS

Not Applicable

STATEMENT OF GOVERNMENT INTEREST

Not applicable.

TECHNICAL FIELD OF THE DISCLOSURE

The present disclosure relates in general to machine motion control for use in manufacturing environments. The disclosure relates in particular a rotary motor driven stage with a driving mechanism that is independent from payload support.

DISCUSSION OF BACKGROUND

Various technologies exist for moving apparatus on a plane in manufacturing environments. Mechanized stages typically use two linear stages stacked upon one another to allow movement in both the x-axis and the y-axis. The linear stages are typically driven with a motor that turns a lead screw engaged with a carrier. The carrier is indexed into the grooves of the lead screw and moves along the grooves of the spinning lead screw. Position is determined by a rotary encoder affixed to either a stepper or servo motor and/or encoding along the linear stages. This application relates to another approach.

SUMMARY OF THE DISCLOSURE

Disclosed herein is an apparatus and methods for positioning along a plane. The apparatus having a first rotary motor engaged with a first timing belt. The first timing belt engaged with a first bearing car. The first bearing car engaged with a first linear rail. The first linear rail fixed to a frame. A second bearing car attached to the first bearing car, the second bearing car engaged to a second linear rail. The second linear rail at an incline with respect to the first linear rail, the second linear rail fixed to a stage. The apparatus further comprising a second rotary motor engaged with a second timing belt. The second timing belt engaged with a third bearing car, the third bearing car engaged with the first linear rail. A fourth bearing car attached to the third bearing car, the fourth bearing car engaged to a third linear rail. The third linear rail at an incline with respect to the first linear rail, the third linear rail not parallel to the second linear rail, and the third linear rail fixed to the stage.

BRIEF DESCRIPTION OF THE DRAWINGS

The accompanying drawings, which are incorporated in and constitute a part of the specification, illustrate preferred methods and embodiments of the present disclosure. The drawings together with the general description given above and the detailed description of preferred methods and embodiments given below, serve to explain principles of the present disclosure.

FIG. 1 is a perspective view of an apparatus for translating along at least one plane defined by axes, the apparatus comprising a first rotary motor engaged with a first timing belt, the first timing belt engaged with a first bearing car, the first bearing car engaged with a first linear rail, the first linear rail fixed to a frame; a second bearing car attached to the first bearing car, the second bearing car engaged to a second linear rail, the second linear rail at an incline with respect to the first linear rail, the second linear rail fixed to a stage; and a second rotary motor engaged with a second timing belt, the second timing belt engaged with a third bearing car, the third bearing car engaged with the first linear rail, a fourth bearing car attached to the third bearing car, the fourth bearing car engaged to a third linear rail, the third linear rail at an incline with respect to the first linear rail, the third linear rail not parallel to the second linear rail, the third linear rail fixed to the stage.

DETAILED DESCRIPTION OF THE DISCLOSURE

Referring now to the drawings, wherein like components are designated by like reference numerals. Methods and embodiments of the present disclosure are described further herein.

Figure 1:
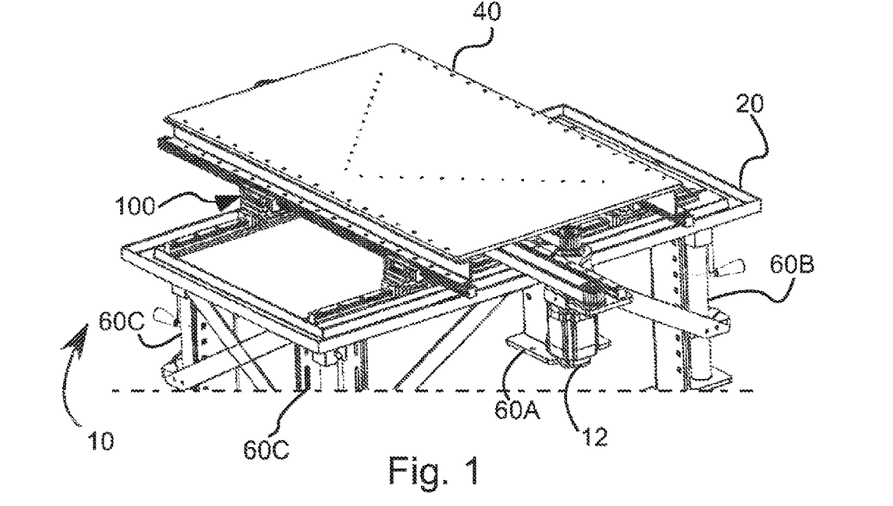
Figure 2:
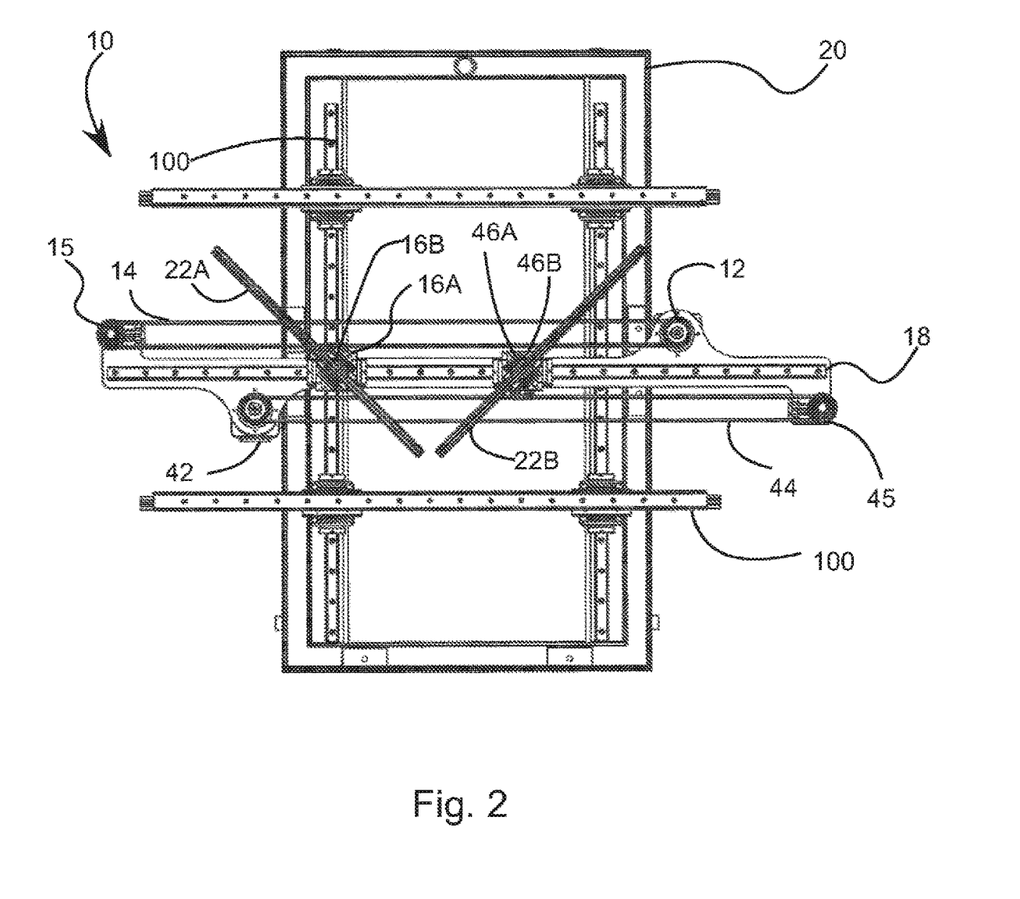
FIG. 2 is a plan view of the apparatus described in FIG. 1, further detailing movement of the stage.

FIG. 1 and FIG. 2 provide a partial perspective view and a plan view of an apparatus 10 for translating along at least one plane defined by axes. The plan view provides a view of apparatus 10 wherein a stage 40 is removed from view. Apparatus 10 has a first rotary motor 12 engaged with a first timing belt 14, the first timing belt 14 engaged with a first bearing car 16A, the first bearing car engaged with a first linear rail 18, the first linear rail 18 fixed to a frame 20; a second bearing car 16B attached to the first bearing car 16A, the second bearing car 16B engaged to a second linear rail 22A, the second linear rail 22A at an incline with respect to the first linear rail 18, the second linear rail 22A fixed to a stage 40; and a second rotary motor 42 engaged with a second timing belt 44, the second timing belt 44 engaged with a third bearing car 46A, the third bearing car 46A engaged with the first linear rail 18, a fourth bearing car 46B attached to the third bearing car 46A, the fourth bearing car 46B engaged to a third linear rail 22B, the third linear rail 22B at an incline with respect to the first linear rail 18, the third linear rail 22B not parallel to the second linear rail 22A, the third linear rail 22B fixed to the stage 40. A support system 100, explained in further detail hereinbelow, is attached to the frame 20 and supports a payload of the stage and provides freedom of motion within the plane. A first leg 60A, second leg 60B, third leg 60C and fourth leg 60D are attached to and adjustably elevate the frame.

At the ends opposite the rotary motors, the first and second timing belts are held in tension by an idler pulley 15 and an idler pulley 45, respectively. Other embodiments can include further components such as guides or additional tension pulleys common in timing belt apparatus. As shown, the first timing belt 24 and second timing belt 44 movement is generally adjacent to and preferably parallel to the first linear rail 18 allowing the timing belts to move the first and third bearing cars along the first linear rail.

Operationally, the rotary motors drive the timing belts and the first and third bearing cars along the first linear rail. In turn the second and fourth bearing may move along the second and third linear rail thereby moving the stage. Here, the second linear rail 22A and the third linear 22B are inclined at −45 and 45 degrees with respect to the first linear rail and thereby orthogonal to one another. Referencing FIG. 2, if both the first and third bearing cars move to the left, the stage is driven to the left. If the first and third bearing cars move right, the stage moves to the right. Moving the first and third bearing cars together or apart moves the stage aft of forward respectively. Illustrated examples are provided further below.

In practice, the second linear rail's incline angle can be any angle that is not parallel and not orthogonal to the first linear rail and not parallel to the third linear rail. The with respect to the third linear rail, the incline angle needs to be greater than 0 degrees and less than 180 degrees. Although minute angular variations from the aforementioned requirements are possible, those skilled in the art will recognize the angle must be sufficiently large such that the stage does not bind.

The apparatus preferably has positional feedback. In one embodiment, the rotary motors are encoded and the timing belt is indexed to ensure no or limited slippage. With known angles between the linear rails and positional feedback of the rotary motors the stage can be moved and controlled with precision. In this embodiment, cabling is limited to the rotary motors and can be secured in a stationary position. In another embodiment, the first linear rail is encoded and the location of the first and third bearing cars can be used to determine stage location based on the geometry of the apparatus. In yet another embodiment, the second and third linear rail can be encoded and likewise stage location is determined based on the geometry of the system.

Figure 3A:
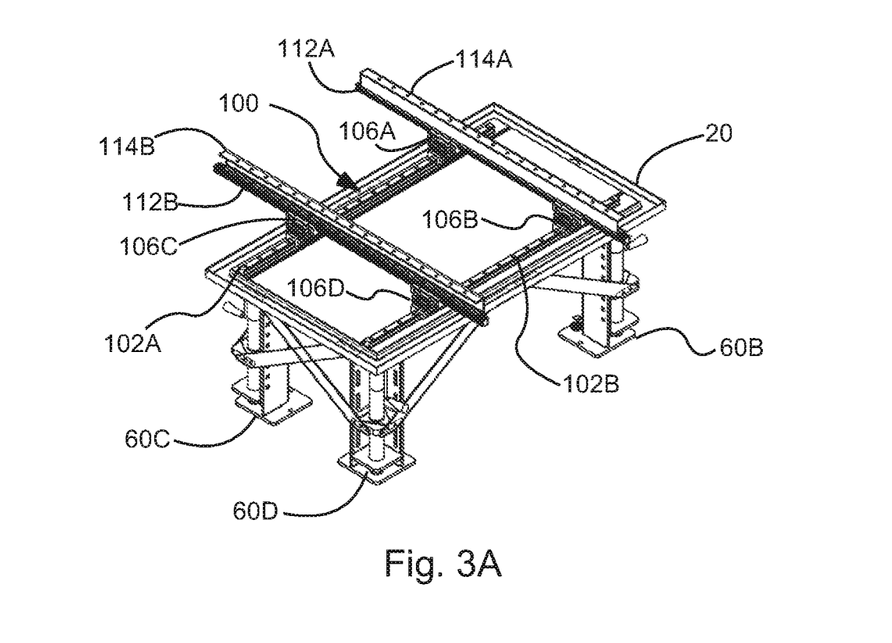
FIG. 3A provides a perspective view exemplifying a support system provided in FIG. 1 with the rotary motor, timing belts, and related linear rails not shown.
Figure 3B:
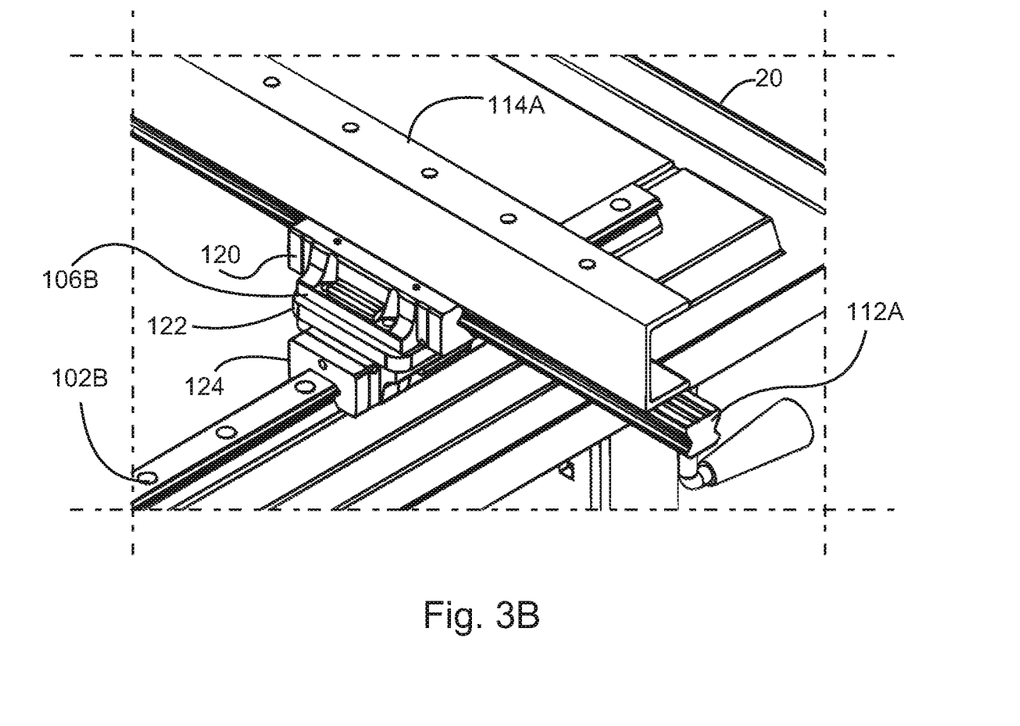
FIG. 3B provides a zoom perspective view exemplifying a portion of the support system provided in FIG. 3A.

Referring to FIG. 3A and FIG. 3B, apparatus 10 is shown in a perspective view exemplifying the support system 100 with rotary motors, timing belts, and linear rails not shown. Support system 100 comprises a lower linear rail 102A and a lower linear rail 102B mounted to a platform 20 running in parallel. A support bearing car apparatus 106A and 106C are engaged with lower linear rail 102A and an upper linear rail 112A and an upper linear rail 112B. Similarly, a support bearing car apparatus 106B and 106D are engaged with the linear rail 102B and an upper linear rail 112A and an upper linear rail 112B. Linear rail 112A and linear rail 102B running in parallel. The two lower linear rails and the two upper linear rails form a parallelogram from a plan view perspective. In this example, the parallelogram is a rectangle with the upper linear rails oriented 90 degrees with respect to the lower linear rails. A stage mount 114A and a stage mount 114B are mounted to upper linear rail 114A and upper linear rail 114B respectively. The stage (not shown here) mounts to the stage mounts. In this parallelogram arrangement the stage moves along a plane defined by the axes.

Referring specifically to FIG. 3B, a zoom view of support bearing car apparatus 106B is shown. Support bearing car apparatus 106B has a lower bearing car 124 engaged with the lower linear rail 102B. An adapter 122 connects lower bearing car 124 with an upper bearing car 120. Upper bearing car 120 engages with the upper linear rail 112A. Here lower bearing car 124 and upper bearing car 120 are oriented 90 degrees with respected to one another.

Figure 4A:
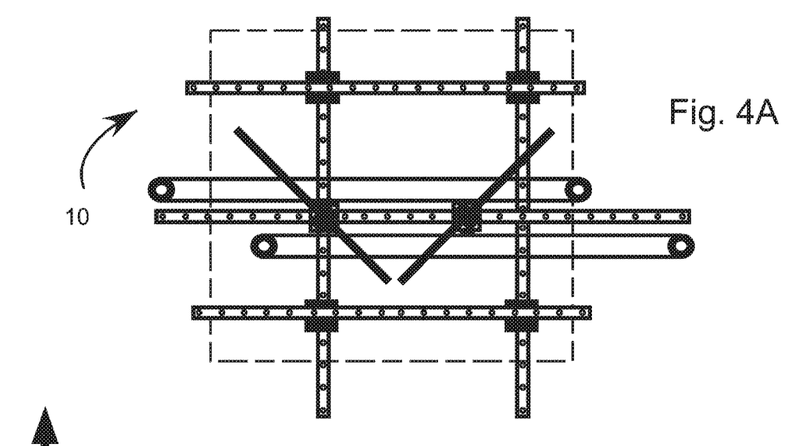
FIG. 4A is a plan view of a simplified version of the apparatus shown in FIG. 1 for motion reference.

Referring to FIG. 4A, FIG. 4B, FIG. 4C, FIG. 4D, FIG. 4E various examples of stage movement are provided in a simplified view highlighting the rotary motors, first, second and third linear rails, bearing cars and support system. FIG. 4A provides a view of the stage in a middle position for reference relative to movement positions in FIGS. 4B, 4C, 4D, and 4E.

Figure 4B:
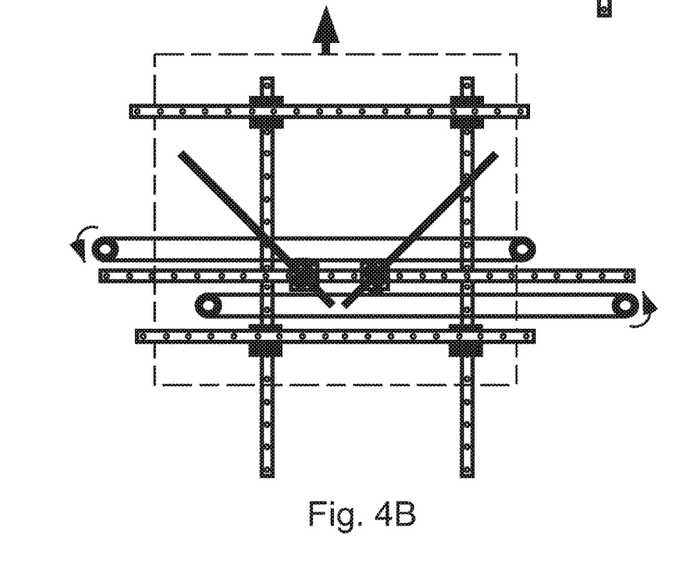
FIG. 4B is a plan view of the simplified apparatus shown in FIG. 4A wherein aft movement is visually demonstrated.
Figure 4C:
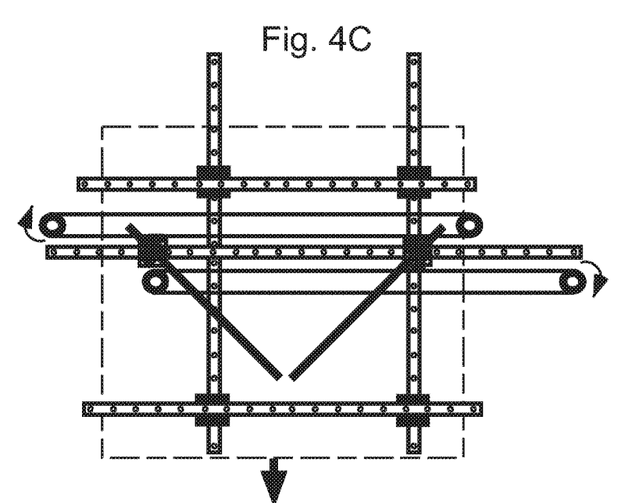
FIG. 4C is a plan view of the simplified apparatus shown in FIG. 4A wherein forward movement is visually demonstrated.

FIG. 4B and FIG. 4C demonstrates the stage movement aft and forward respectively with movement denoted by the reference arrows. FIG. 4B provides aft movement wherein the rotary motors drive the second and fourth bearing cars together causing the stage (represented by the dashed rectangle) to move aft. FIG. 4C provides forward movement wherein the rotary motors drive the second and fourth bearing cars apart causing the stage to move forward.

Figure 4D:
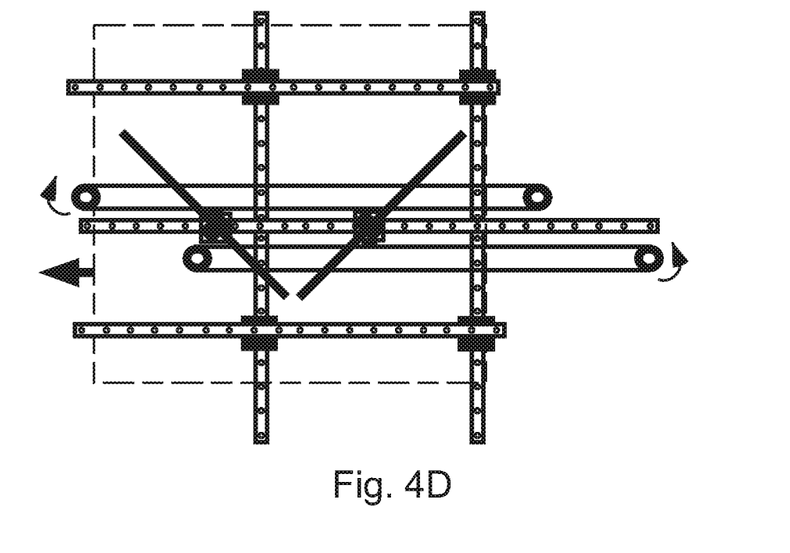
FIG. 4D is a plan view of the simplified apparatus shown in FIG. 4A wherein movement to the left is visually demonstrated.
Figure 4E:
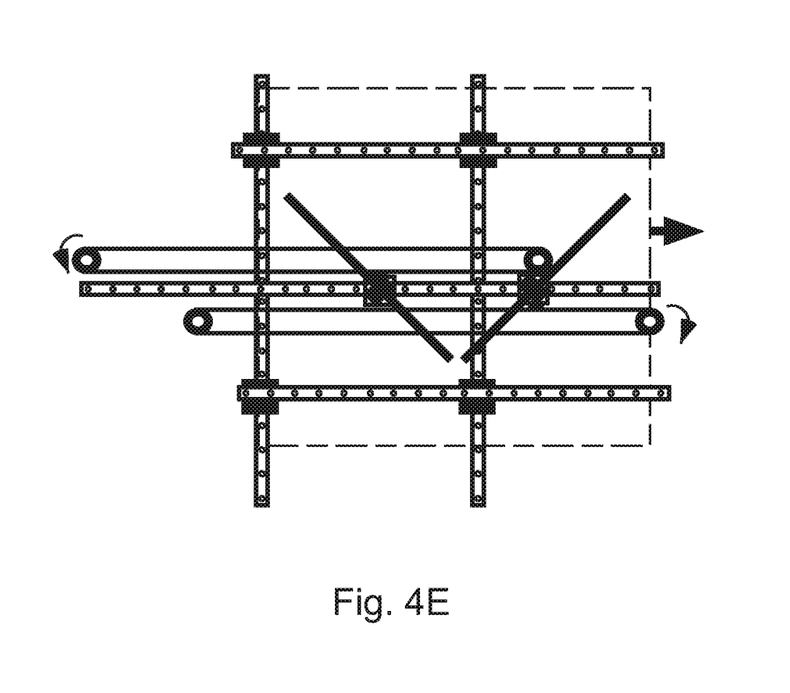
FIG. 4E is a plan view of the simplified apparatus shown in FIG. 4A wherein aft movement to the right is visually demonstrated.

FIG. 4D and FIG. 4E provide movement left and right respectively. FIG. 4D provides movement to the left wherein the rotary motors drive the second and further bearing cars synchronously to the left. The FIG. 4E provides movement to the right wherein the rotary motors drive the second and fourth bearing cars synchronously to the right.

Figure 5:
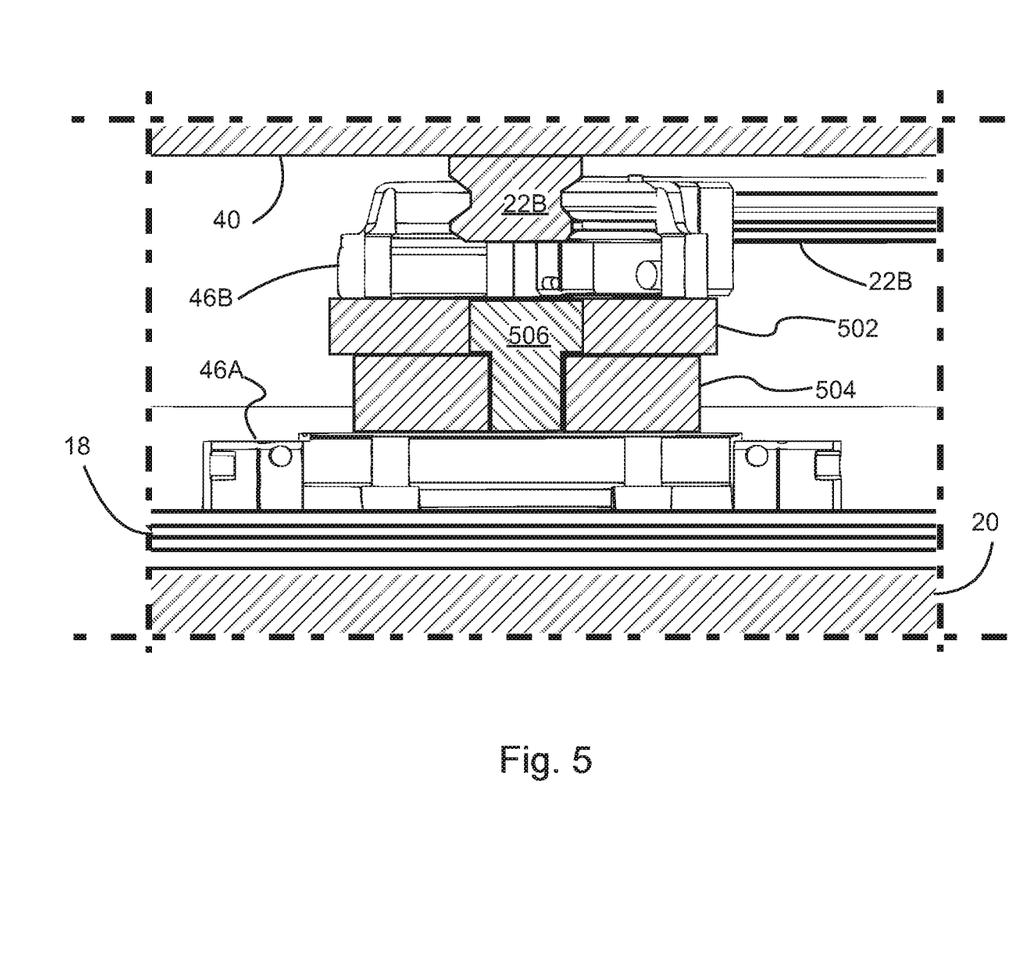
FIG. 5 is a cross-section view of detailing the third bearing car and fourth bearing car's connecting hardware.

Referring to FIG. 5, a cross-section view details the third bearing car attached to the fourth bearing car. Here, third bearing car 46A is attached to fourth bearing car 46B with a mounting plate 502 and mounting plate 504. Mounting plate 502 is engaged with mounting plate 504 via a connecting hardware 506. Connecting hardware can be a threaded screw, pin, or rivet. In some embodiments, the connecting hardware allows rotational freedom between mounting plate 502 and mounting plate 504.

Figure 6A:
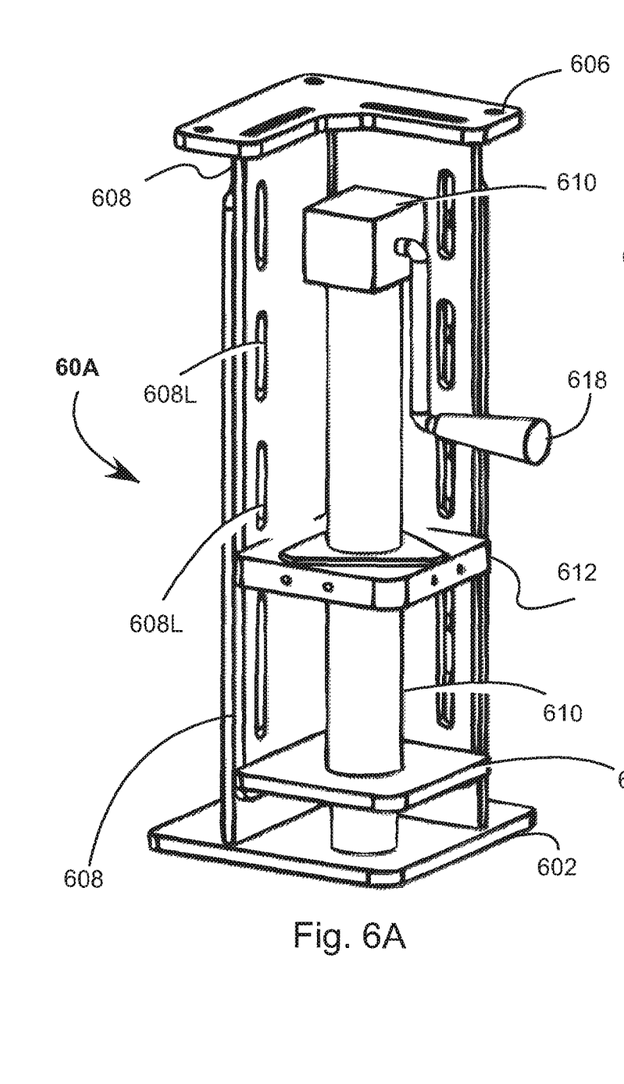
FIGS. 6A and 6B provide perspective views of a leg shown in FIG. 1.
Figure 6B:
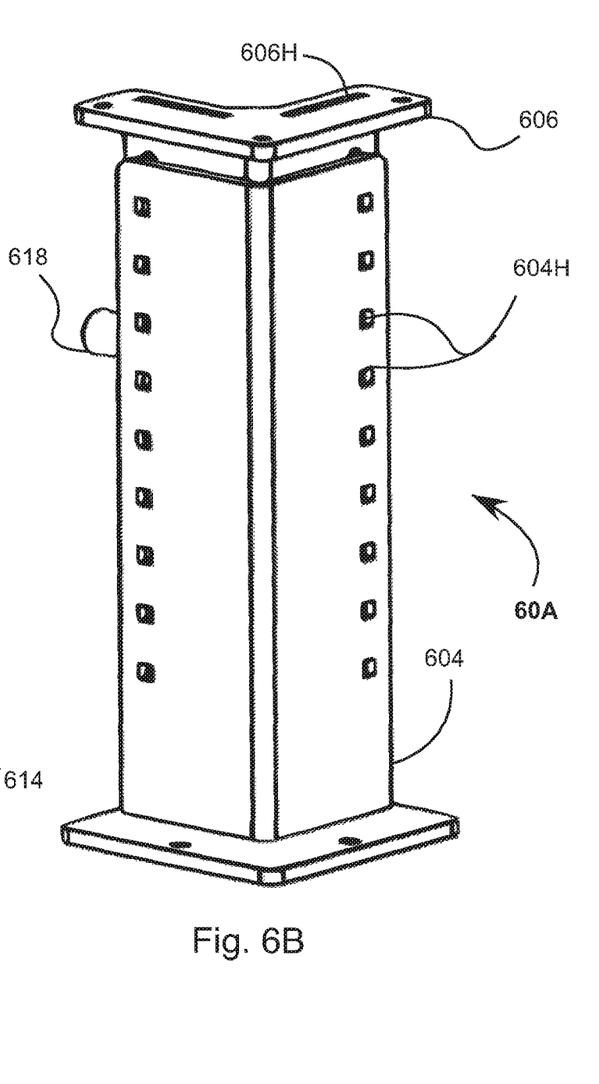

Referring to FIG. 6A and FIG. 6B, perspective views from opposite sides further detail first leg 60A. First leg 60A has a base 602 with a plurality of mounting holes 602H for anchoring to a surface. Base 602 is attached to a lower L-shaped support wall 604, the lower L-shaped support having a plurality of mounting holes 604H. A platform 606 for attaching to the aforementioned frame is attached to an upper L-shaped support wall 608, the upper L-shaped support wall having a plurality of slots 608L that align vertically with mounting holes 604H. A jack 610 is attached to base 602 and has a support member 612 and 614 attached to upper L-shaped support wall 608. The upper support wall is confined between the jack's supports members 612 and 614 and lower L-shaped support wall 602. Operationally, and without hardware installed within the mounting hole 604H and slots 608L, the jack lowers or raises the upper L-shaped support wall and platform via a handle 618 relative to the lower L-shaped support wall thereby allowing vertical adjustment.

Figure 7:
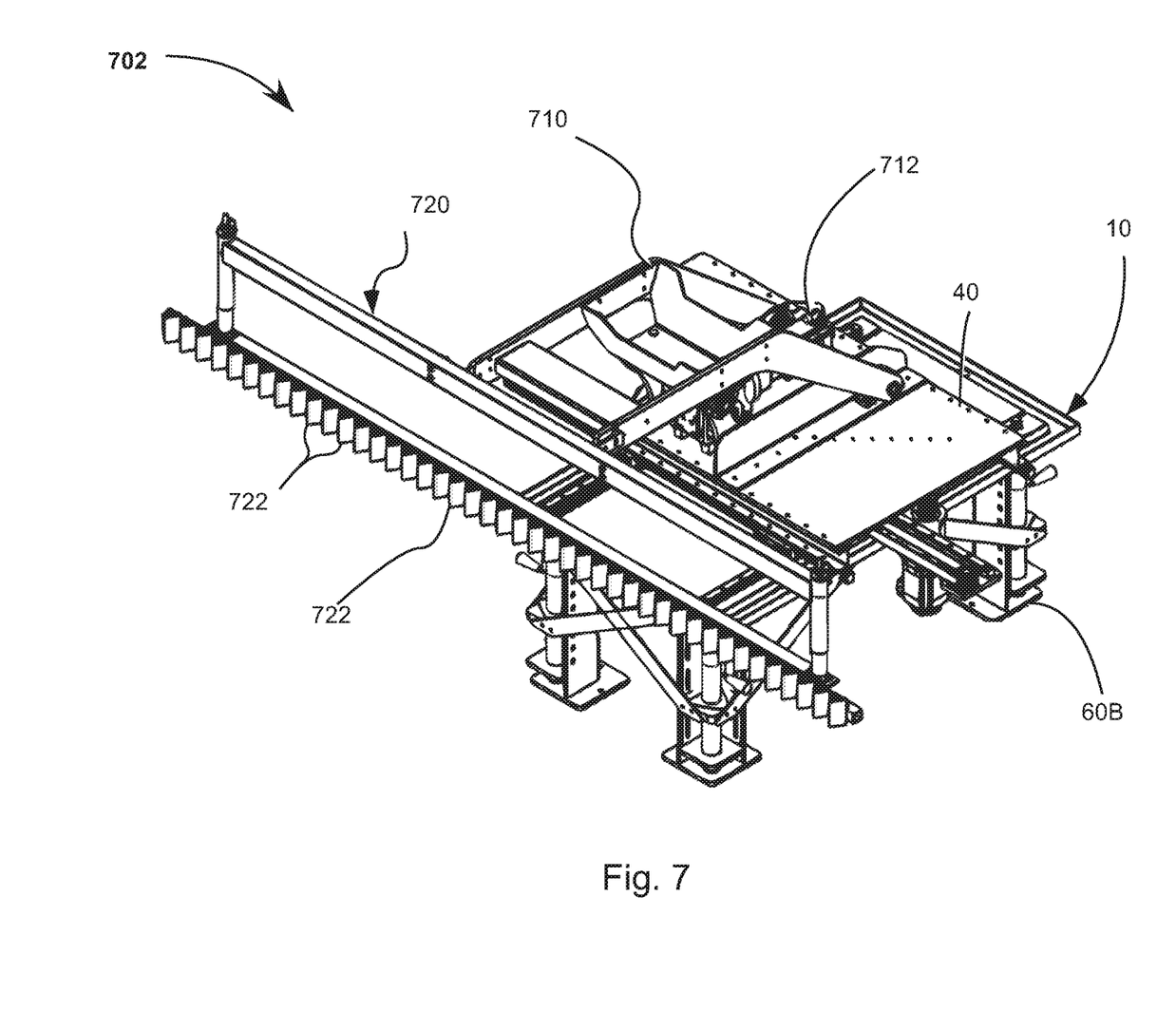
FIG. 7 is a perspective view of the apparatus shown in FIG. 1, further having a vertical lift axis and a push bar for implementation as a Lehr loader.

FIG. 7 is a perspective view of the apparatus of the present disclosure implemented as a Lehr loader 702. The above described apparatus 10 has a lift 710 affixed to stage 40. The lift axis has an actuator 712 to drive the lift 710 in a lift or vertical axis. Actuator 712 can be a cam attached to a rotary motor with feedback, a pneumatic cylinder, of other such means. A push bar 720 is attached to the lift and has a plurality of indexed members 722 for contacting glassware.

In operation, apparatus 10 engages with a plurality of glassware with the push bar and moves the plurality of glassware into a Lehr oven from a conveyor belt.

The current apparatus provides a stage driven with motors that remain stationary while providing 2-axes of motion within the plane. Further, the support system is independent from the driving motors. The stage load is supported by the support system and the driving motors and related apparatus do not support the load of the stage or anything affixed to the stage.

The apparatus' unique configuration can incorporate custom or standard linear rails, bearing cars, and rotary motors that are commercially available from a variety of manufacturers including THK, HIWIN, BOSCH, NSK, SIEMENS, SEW-EURODRIVE, CONEDRIVE, and STOBER. Such components from various manufacturers can be found at McMaster-Carr or another such distributor.

While at least one implementation of the current apparatus has been described, the apparatus can be used in a variety of other applications. For instance, the apparatus could be used as a test bed for laser trackers, such as computer mice, force feedback for keyboard testing and surface devices.

From the description of the present disclosure provided herein one skilled in the art can implement the method of manufacture in accordance with the present invention. While the present invention has been described in terms of particular examples, others can be implemented without departing from the scope of the disclosure. In summary, the present invention is described above in terms of particular embodiments. The invention, however, is not limited to the embodiments described and depicted herein. Rather, the invention is limited only by the claims appended hereto.

What is claimed is:

1. An apparatus for translating along at least one plane defined by axes, the apparatus comprising:
    a first support system and a second support system supporting the weight of a stage and the stage's load, the first support system providing for movement in a first axis and the second support system providing for movement in a second axis,
    a first rotary motor engaged with a first timing belt, the first timing belt engaged with a first bearing car, the first bearing car engaged with a first linear rail, the first linear rail fixed to a frame; a second bearing car attached to the first bearing car, the second bearing car engaged to a second linear rail, the second linear rail at an incline with respect to the first linear rail, the second linear rail fixed to the stage; and
    a second rotary motor engaged with a second timing belt, the second timing belt engaged with a third bearing car, the third bearing car engaged with the first linear rail, a fourth bearing car attached to the third bearing car, the fourth bearing car engaged to a third linear rail, the third linear rail at an incline with respect to the first linear rail, the third linear rail not parallel to the second linear rail, the third linear rail fixed to the stage.

2. The apparatus of claim 1, wherein the first support system and the second support system each comprise of a least two parallel rails, each of the parallel rails with two support bearing cars.

3. The apparatus of claim 1 wherein the first timing belt is positioned to move in a direction parallel to the first support system.

4. The apparatus of claim 1, wherein the second linear rail axis and third linear rails are non-parallel.

5. The apparatus of claim 1, further comprising a lift axis affixed to the stage.

6. The apparatus of claim 5, wherein the lift axis to be actuated with a cam attached to a rotary motor with positional feedback.

7. The apparatus of claim 5, wherein the lift axis may be actuated with a pneumatic cylinder.

8. The apparatus of claim 5, wherein the lift axis has a push bar for making contact with glassware.

9. The apparatus of claim 1, wherein the rotary motors are servo driven or otherwise have positional feedback.

10. The apparatus of claim 1, wherein the rotary motors are affixed in relation to the frame.

11. The apparatus of claim 1, wherein the rotary motors have fixed cabling.

12. The apparatus of claim 1, wherein the first bearing car is engaged with second bearing car with a pin, the pin allowing rotational freedom between the first and second bearing cars.

13. The apparatus of claim 1, wherein the frame is mounted on a plurality of support legs, the support legs having adjustable height.

14. The apparatus of claim 13, wherein the support legs have jacks to adjust height.

15. A method of loading bottles into a Lehr oven comprising:
    providing an apparatus, the apparatus comprising a first rotary motor engaged with a first timing belt, the first timing belt engaged with a first bearing car, the first bearing car engaged with a first linear rail, the first linear rail fixed to a frame; a second bearing car attached to the first bearing car, the second bearing car engaged to a second linear rail the second linear rail at an incline with respect to the first linear rail, the second linear rail fixed to a stage, and the apparatus further comprising a second rotary motor engaged with a second timing belt, the second timing belt engaged with a third bearing car, the third bearing car engaged with the first linear rail, a fourth bearing car attached to the third bearing car, the fourth bearing car engaged to a third linear rail, the third linear rail at an incline with respect to the first linear rail, the third linear rail not parallel to the second linear rail, the third linear rail fixed to the stage; and
    engaging a plurality of glassware with a push bar and moving the plurality of glassware into a Lehr oven.

16. The method of claim 15, wherein the push bar engages with the plurality of glassware as they move along a conveyor.

* * * * *